(12) United States Patent
Kang et al.

(10) Patent No.: US 10,523,323 B2
(45) Date of Patent: Dec. 31, 2019

(54) APPARATUS AND METHOD FOR EQUALIZATION AND COMPENSATION OF CHROMATIC DISPERSION IN OPTICAL TRANSMISSION

(71) Applicant: ELECTRONICS AND TELECOMMUNICATIONS RESEARCH INSTITUTE, Daejeon (KR)

(72) Inventors: Hun Sik Kang, Daejeon (KR); Sang Rok Moon, Daejeon (KR); Seung-Woo Lee, Daejeon (KR); Sun Hyok Chang, Daejeon (KR); In Ki Hwang, Daejeon (KR)

(73) Assignee: ELECTRONICS AND TELECOMMUNICATIONS RESEARCH INSTITUTE, daejeon (KR)

( * ) Notice: Subject to any disclaimer, the term of this patent is extended or adjusted under 35 U.S.C. 154(b) by 0 days.

(21) Appl. No.: 16/207,287

(22) Filed: Dec. 3, 2018

(65) Prior Publication Data
US 2019/0319708 A1 Oct. 17, 2019

(30) Foreign Application Priority Data
Apr. 17, 2018 (KR) .................. 10-2018-0044486

(51) Int. Cl.
*H04B 10/54* (2013.01)
*H04B 10/2513* (2013.01)
*H04B 10/079* (2013.01)

(52) U.S. Cl.
CPC . *H04B 10/25133* (2013.01); *H04B 10/07951* (2013.01); *H04B 10/54* (2013.01); *H04B 2210/252* (2013.01)

(58) Field of Classification Search
CPC .......... H04B 10/25133; H04B 10/0775; H04B 10/2513; H04B 10/6161; H04B 10/6971;
(Continued)

(56) References Cited

U.S. PATENT DOCUMENTS 6,252,692 B1 * 6/2001 Roberts .............. H04B 10/2513
398/147
6,580,542 B1 6/2003 Song et al.
(Continued)

FOREIGN PATENT DOCUMENTS

JP 2008-312071 A 12/2008

OTHER PUBLICATIONS

J. R. Barry et al., "Adaptive Equalization", Digital Communication, Kluwer Academic Publishers, 2004.
(Continued)

*Primary Examiner* — Tanya T Motsinger
(74) *Attorney, Agent, or Firm* — LRK PATENT LAW FIRM (57) ABSTRACT

A method and apparatus for compensation of a chromatic dispersion through an optical compensation and an electronical compensation in optical communication. An optical communication method receives an optical signal, estimates a first transmission length based on a null component included in a frequency spectrum of the optical signal, optically compensates for a chromatic dispersion of the optical signal based on the first transmission length, estimates a second transmission length based on a null component included in a frequency spectrum of the compensated optical signal, and electronically compensates for a residual chromatic dispersion of the compensated optical signal based on the second transmission length.

15 Claims, 10 Drawing Sheets

(58) Field of Classification Search
CPC .............. H04B 10/25253; H04B 10/60; G02B 6/02214; G02B 6/29392; G02B 6/29394
See application file for complete search history.

(56) References Cited

U.S. PATENT DOCUMENTS

| | | | |
|---|---|---|---|
| 2005/0105916 A1 | 5/2005 | Lee et al. | |
| 2005/0244164 A1* | 11/2005 | Miyashita | H04B 10/25253 398/147 |
| 2009/0116844 A1* | 5/2009 | Tanaka | H04B 10/677 398/115 |
| 2009/0169213 A1 | 7/2009 | Lowery et al. | |
| 2010/0054759 A1* | 3/2010 | Oda | H04B 10/6971 398/202 |
| 2010/0232802 A1* | 9/2010 | Boffi | G02B 6/29394 398/149 |
| 2010/0329698 A1* | 12/2010 | Nakashima | H04B 10/60 398/208 |
| 2011/0058820 A1* | 3/2011 | Ooi | H04B 10/2513 398/147 |
| 2011/0103791 A1* | 5/2011 | Umnov | H04B 10/07951 398/1 |
| 2011/0205531 A1* | 8/2011 | Ohtani | G01M 11/335 356/73.1 |
| 2012/0183305 A1* | 7/2012 | Umnov | H04B 10/0775 398/152 |
| 2015/0341138 A1* | 11/2015 | Ishihara | H04B 10/25133 398/35 |
| 2016/0099777 A1* | 4/2016 | Liu | H04B 10/2513 |
| 2018/0026720 A1* | 1/2018 | Yi | G02B 6/02214 398/147 |

OTHER PUBLICATIONS

Scott C. Douglas et al., "Convergence Issues in the LMS Adaptive Filter", 2000 CRC Press LLC.

* cited by examiner

| Transmission length (km) | Valid symbol period | Number of taps (transmission signal symbol standard: 28 GHz) |
|---|---|---|
| 10 | -1.5~1.5 | 3~4 |
| 20 | -2.5~2.5 | 5~6 |
| 40 | -5~5 | 10~12 |
| 80 | -9.5~9.5 | 20~24 |

Output of second order differential digital filter

APPARATUS AND METHOD FOR EQUALIZATION AND COMPENSATION OF CHROMATIC DISPERSION IN OPTICAL TRANSMISSION

CROSS-REFERENCE TO RELATED APPLICATION(S)

This application claims the benefit of Korean Patent Application No. 10-2018-0044486, filed on Apr. 17, 2018, in the Korean Intellectual Property Office, the disclosure of which is incorporated herein by reference.

BACKGROUND

1. Field of the Invention

One or more example embodiments relate to technology related to a method of extending an intensity modulation and direct detection (IMDD) dispersion compensation distance by combining an optical dispersion compensation and an electronic dispersion compensation with respect to a dispersion occurring in IMDD optical communication.

2. Description of Related Art

IMDD optical communication is a scheme of transmitting transmission information by adjusting an intensity of light according to the transmission information and restoring the transmission information using an optical detector such as a photodiode. This scheme is widely used in optical communication due to its simple configuration and price competitiveness. However, the IMDD optical communication has a limited transmission length and thus, is used principally in a short-distance section, for example, below 40 km. It is mainly because of a chromatic dispersion that a transmission rate changes based on a frequency of a signal proceeding in an optical fiber, an optical transmission medium, in the IMDD optical communication. The signal received through the optical detector may cause an inter-symbol interference (ISI) that the received signal overlaps an adjacent information signal due to the chromatic dispersion, and the thus signal may be distorted. To restore the original information, the interference phenomenon caused by the chromatic dispersion should be removed. The chromatic dispersion may increase as the transmission length increases and the data transmission rate increases. Thus, there may be provided a limitation to an increase in the transmission length and the transmission rate.

A method of compensating for a chromatic dispersion occurring as passing through the optical fiber may include an optical compensation method and an electronical compensation method. To increase a transmission capacity and extend the transmission length in IMDD optical communication, an interference effect caused by the chromatic dispersion needs to be removed. However, there is a limitation to a compensation for the chromatic dispersion through applying of one of the optical compensation method and the electronic compensation method. The optical compensation method needs to know the transmission length in advance, and the electronic compensation method has a limitation to an increase in the chromatic dispersion performance due to a loss of phase information and thus, has a relatively short transmission length.

SUMMARY

An aspect provides technology which estimates a transmission length and effectively removes an interference effect caused by a chromatic dispersion using optical compensation and electronic compensation methods together based on the transmission length to increase a transmission capacity and extend the transmission length in optical communication.

According to an aspect, there is provided an optical communication method including receiving an optical signal, estimating a first transmission length based on a null component included in a frequency spectrum of the optical signal, optically compensating for a chromatic dispersion of the optical signal based on the first transmission length, estimating a second transmission length based on a null component included in a frequency spectrum of the compensated optical signal, and electronically compensating for a residual chromatic dispersion of the compensated optical signal based on the second transmission length.

The first transmission length may be greater than the second transmission length.

The estimating of the first transmission length may include extracting at least one null component from the frequency spectrum of the optical signal, and estimating the first transmission length based on a position and a number of the extracted null component.

The optically compensating may include removing the chromatic dispersion from the optical signal by inversely generating a chromatic dispersion effect corresponding to the first transmission length.

The estimating of the second transmission length may include extracting at least one null component from the frequency spectrum of the compensated optical signal, and estimating the second transmission length based on a position and a number of the extracted null component.

The electronically compensating may include optimizing a convergence time of an equalizer for electronically compensating for the residual chromatic dispersion based on the second transmission length.

The optimizing may include estimating a valid period of a channel impulse response based on the second transmission length, and determining a parameter of the equalizer based on the valid period.

The electronically compensating may include adjusting a number of taps based on the second transmission length.

According to another aspect, there is provided a chromatic dispersion compensation apparatus including a spectrum null analyzer configured to analyze a frequency spectrum of an optical signal, a transmission length estimator configured to estimate a first transmission length based on a null component included in the frequency spectrum, an optical dispersion compensation module configured to optically compensate for a chromatic dispersion of the optical signal based on the first transmission length, and an equalizer configured to electronically compensate for a residual chromatic dispersion of the compensated optical signal.

The spectrum null analyzer may include a transform module configured to obtain the frequency spectrum of the optical signal, and a spectrum null parameter extractor configured to extract at least one null component from the frequency spectrum of the optical signal.

The transmission length estimator may be configured to estimate the first transmission length based on a position and a number of the extracted null component.

The transmission length estimator may be configured to estimate a second transmission length based on a null component included in a frequency spectrum of the optically compensated optical signal.

The chromatic dispersion compensation apparatus may further include an equalizer parameter setter configured to set a parameter of the equalizer so as to optimize a convergence time of the equalizer for electronically compensating for the residual chromatic dispersion based on the second transmission length, and transmit the set parameter to the equalizer.

The chromatic dispersion compensation apparatus may further include an optical receiver configured to restore transmission information based on the optical signal compensated by the optical dispersion compensation module.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. However, various alterations and modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Hereinafter, example embodiments will be described in detail with reference to the accompanying drawings.

Figure 1:
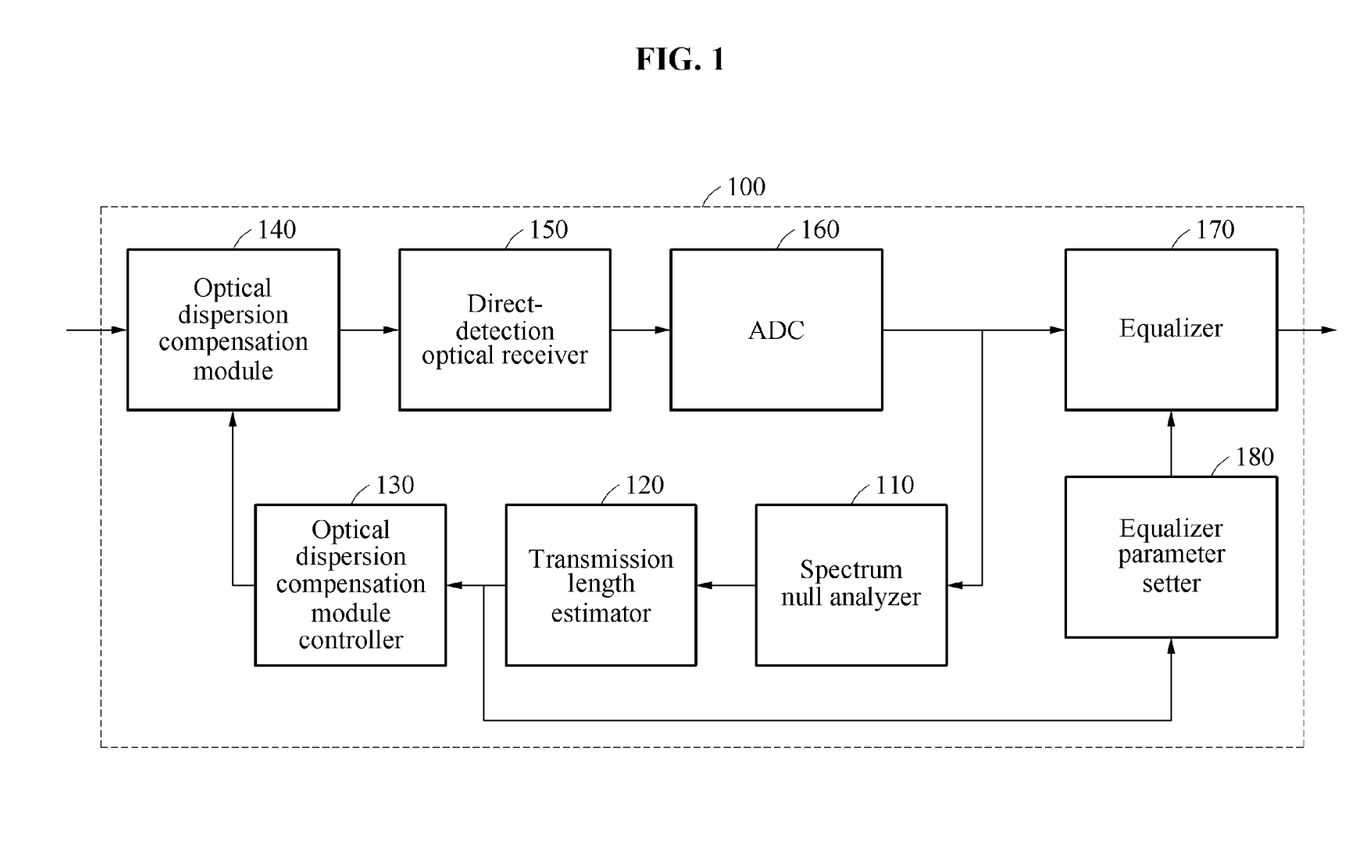
FIG. 1 is a block diagram illustrating a chromatic dispersion compensation apparatus according to an example embodiment.

FIG. 1 is a block diagram illustrating a chromatic dispersion compensation apparatus according to an example embodiment.

Referring to FIG. 1, a chromatic dispersion compensation apparatus 100 may include a spectrum null analyzer 110, a transmission length estimator 120, an optical dispersion compensation module 140, and an equalizer 170. The chromatic dispersion compensation apparatus 100 may further include an optical dispersion compensation module controller 130, an optical receiver 150, an analog-to-digital converter (ADC) 160, and an equalizer parameter setter 180.

A chromatic dispersion, in which a signal transmission rate varies depending on a frequency of a signal transmitted through an optical fiber, an optical transmission medium, in optical communication, may cause an interference phenomenon that a signal received through an optical detector overlaps an adjacent information signal. The interference phenomenon caused by the chromatic dispersion may be removed to restore a distorted signal to its original information. To remove the interference phenomenon caused by the chromatic dispersion, an optical compensation method and an electronical compensation method may be used. The optical compensation method may use an optical device which adjusts a dispersion by generating a device such as a fiber Bragg grating, or a non-zero dispersion-shifted fiber which inversely generates a chromatic dispersion effect. This method may be a method which inversely generates the chromatic dispersion effect corresponding to a transmission length if the transmission length is known, thereby precisely removing the chromatic dispersion from an optical signal. However, when the transmission length is not known, the optical compensation method may not be effective for compensation and may have difficulty in dynamically dealing with an optical transmission network situation.

The electronical chromatic dispersion method may use the equalizer 170 capable of digital signal processing. For example, a decision-feedback equalizer or a maximum-likelihood sequence equalizer may be used in practice. The equalizer 170 may infer a channel impulse response (CIR) from a received signal and restore its original signal by removing an inter-symbol interference caused by the CIR. An optical transmission CIR may vary depending on a length of an optical transmission line. Thus, an adaptive equalizer may be used to remove a chromatic dispersion effect corresponding to a variable transmission length. The electronic compensation method using an electronic equalizer may have a limitation to a performance in completely removing the chromatic dispersion effect. An optical signal generated by the chromatic dispersion may be represented as a signal having an intensity and a phase component. However, the adaptive equalizer may transmit a signal in response to only an intensity of the optical signal. Thus, a loss of phase information may cause a limitation to an increase in the chromatic dispersion performance and restrict an extension of the transmission length.

By estimating a transmission length by analyzing a received optical signal, performing an optical compensation using the estimated transmission length, and electronically compensating for a residual chromatic dispersion of the compensated optical signal, it is possible to perform an optical compensation, dynamically deal with the optical transmission network situation, and extend the transmission length and a transmission capacity even when an initial transmission length is not known.

When an optical signal is input through an intensity modulation with respect to an information signal, the optical signal may be input into the spectrum null analyzer 110. The spectrum null analyzer 110 may obtain a frequency spectrum response with respect to the received optical signal and extract positions and a number of nulls of a spectrum therefrom. The transmission length estimator 120 may estimate a first transmission length based on the null components included in the frequency spectrum. A method of extracting the positions and the number of the nulls of the spectrum and a method of estimating the transmission length will be described further below. The first transmission length may be a transmission length estimated in a situation in which the chromatic dispersion is not compensated for. The optical dispersion compensation module controller 130 may generate a control signal to control an element capable of a dispersion compensation or a dispersion parameter of the optical dispersion compensation module 140 based on the estimated first transmission length. The transmitted signal may be in a form of current tor voltage which is generated suitable for a form of the signal input from the optical dispersion compensation module 140. The optical dispersion compensation module 140 may be controlled by the optical dispersion compensation module controller 130. The optical dispersion compensation module 140 may include a device which optically compensates using a non-zero dispersion-shifted fiber with a negative dispersion parameter, a device which compensates by changing a refractive index using a device such as a fiber Bragg grating, or an optical dispersion compensation device in a form of an integrated device to which silicon photonics technology is applied. Example embodiments do not include specific configurations of the above devices, but may apply to a scheme of controlling the devices by the above operation. The optical dispersion compensation module 140 may remove the chromatic dispersion from the optical signal by inversely generating the chromatic dispersion effect corresponding to the first transmission length based on the control signal generated by the optical dispersion compensation module controller 130.

An output signal of the optical dispersion compensation module 140 compensating for the chromatic dispersion by the estimated transmission length may be input into the optical receiver 150. The optical receiver 150 may restore transmission information based on the optical signal compensated by the optical dispersion compensation module 140. The optical receiver 150 may be a diode-type optical receiver or a photoconductor-type optical receiver. The directly received signal may be input into the ADC 160 for electronic signal processing. The ADC 160 may convert the transmission information into a digital signal. The ADC 160 may convert a high-order signal modulated or demodulated through pulse-amplitude modulation and discrete multi-tone into a digital signal, and also digitize a pulse-shaped signal into a 1-bit form through non-return-to-zero and transmit the digitized signal. The analog-to-digital converted signal may be input into the equalizer 170 and the spectrum null analyzer 110.

The spectrum null analyzer 110 may obtain a frequency spectrum response with respect to the optical signal compensated by the optical dispersion compensation module 140, and extract positions and a number of nulls of a spectrum therefrom. The transmission length estimator 120 may estimate a second transmission length based on the null components included in the frequency spectrum. The second transmission length may be a transmission length corresponding to a residual chromatic dispersion of a signal received after the optical chromatic dispersion compensation is performed. The second transmission length may be transmitted to the equalizer parameter setter 180. The equalizer parameter setter 180 may set a parameter of the equalizer 170 so as to optimize a convergence time of the equalizer 170 for electronically compensating for the residual chromatic dispersion based on the second transmission length. The parameter set by the equalizer parameter setter 180 may be transmitted to the equalizer 170, and the residual chromatic dispersion of the received signal may be electronically compensated for after the optical compensation is performed by the equalizer 170.

Figure 2:
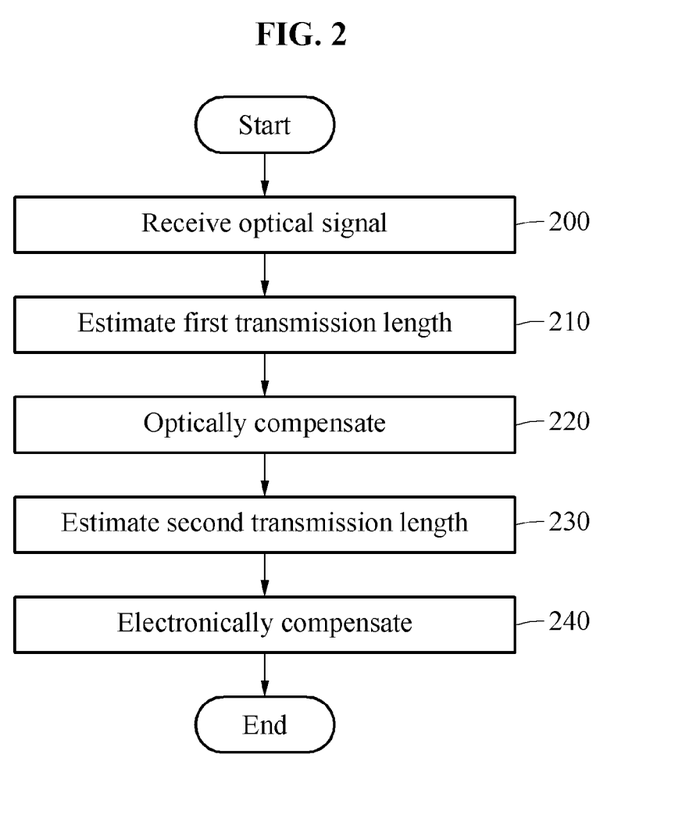
FIG. 2 is a flowchart illustrating an optical communication method according to an example embodiment.

FIG. 2 is a flowchart illustrating an optical communication method according to an example embodiment.

Referring to FIG. 2, in an optical communication method of compensating for a chromatic dispersion, an optical signal may be received in operation 200, a first transmission length may be estimated based on a null component included in a frequency spectrum of the optical signal in operation 210, and a chromatic dispersion of the optical signal may be optically compensated for based on the first transmission length in operation 220. A second transmission length may be estimated based on a null component included in a frequency spectrum of the compensated optical signal in operation 230, and a residual chromatic dispersion of the compensated optical signal may be electronically compensated for based on the second transmission length in operation 240. Since the second transmission length may be a transmission length corresponding to a residual chromatic dispersion of a signal received after the optical chromatic dispersion compensation is performed, the first transmission length may be greater than the second transmission length.

Figure 3:
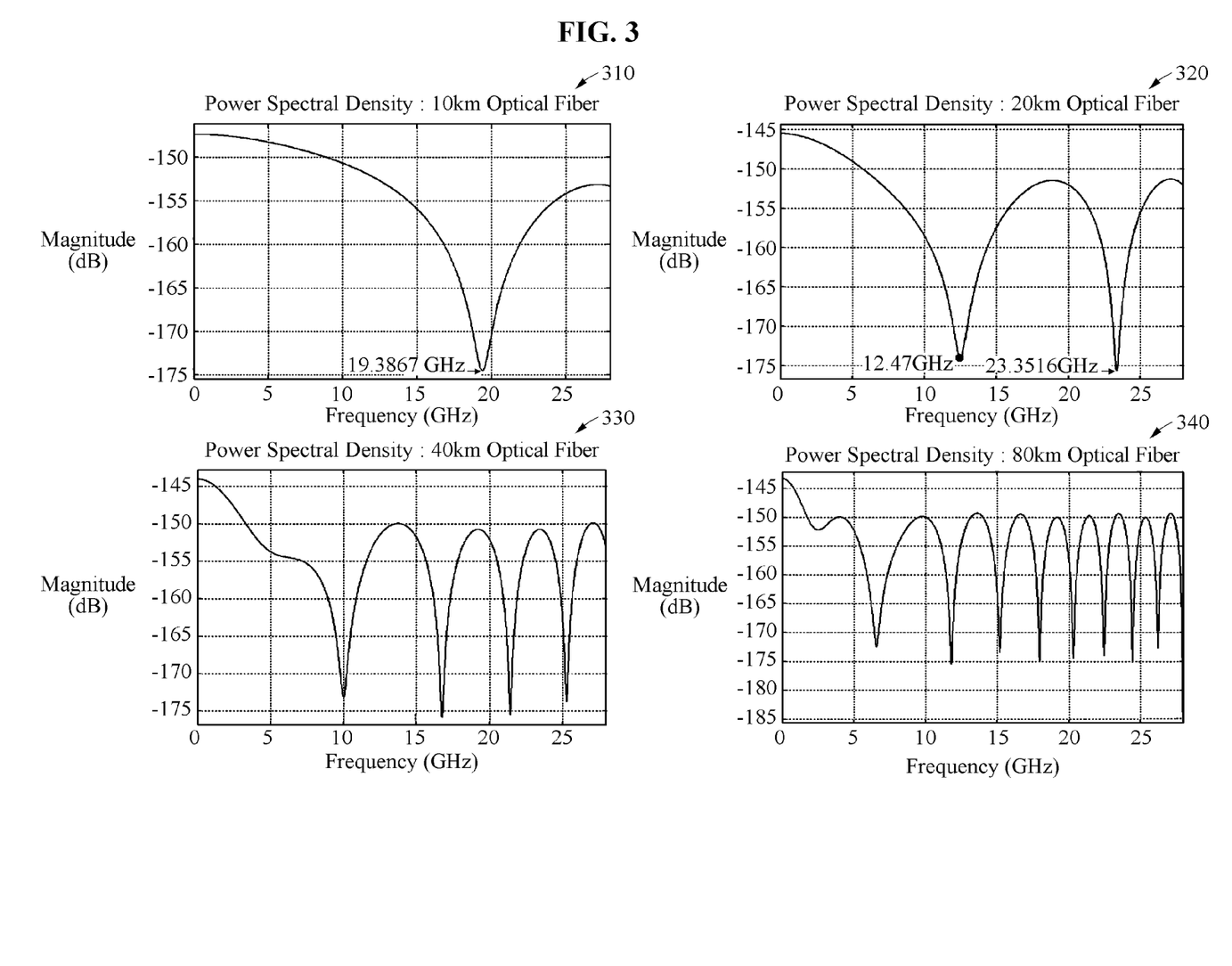
FIG. 3 illustrates graphs showing a frequency spectrum with respect to a transmission length according to an example embodiment.

FIG. 3 illustrates graphs showing a frequency spectrum with respect to a transmission length according to an example embodiment.

Referring to FIG. 3, in optical communication, a frequency spectrum may show a fading phenomenon in which positions and a number of nulls of a spectrum vary depending on a transmission length. In FIG. 3, in a case of a 10-km transmission length of a graph 310, a single frequency null may be generated in a signal bandwidth area at a location corresponding to 19.3867 GHz. In a case of a 20-km transmission length of a graph 320, two frequency nulls may be generated in a signal bandwidth area at locations corresponding to 12.47 GHz and 23.3616 GHz. A frequency response with respect to the signal generated by the chromatic dispersion after passing through an optical fiber may be expressed by Equation 1.

$$i_e(f) = I_0 \cdot m \left| \cos\left(\frac{\pi \lambda^2 D L f^2}{c}\right) \right|$$ [Equation 1]

$i_e$ denotes the frequency response with respect to the signal generated by the chromatic dispersion, m denotes a modulation index, $\lambda$ denotes a wavelength of the optical signal, D denotes a dispersion parameter, f denotes a frequency of the signal, L denotes a transmission length, and c denotes a speed of light. The frequency response may have a shape of sine wave which changes based on a square of the frequency of the signal. According to Equation 1, a null of the frequency response may be generated at a location at which a factor of a cosine function is $\pi/2+k\pi$ (k being a positive integer). The location may be expressed by Equation 2.

$$f_k^2 \cdot L = \frac{c}{2 \cdot \lambda^2 D}(1 + 2k)$$ [Equation 2]

k denotes a frequency at which a null of a k-th frequency response is generated. When a number and positions of nulls of a frequency spectrum are discerned for a signal generated by a chromatic dispersion of an optical fiber, the transmission length may be estimated according to Equation 2. In a real environment, a position of a frequency may be shifted little by little due to a chirping effect. However, the chirping effect of optical modulators used for IMDD optical communication may be diminutive and thus, may not greatly deviate from the transmission length estimated using Equation 2.

Figure 4A:
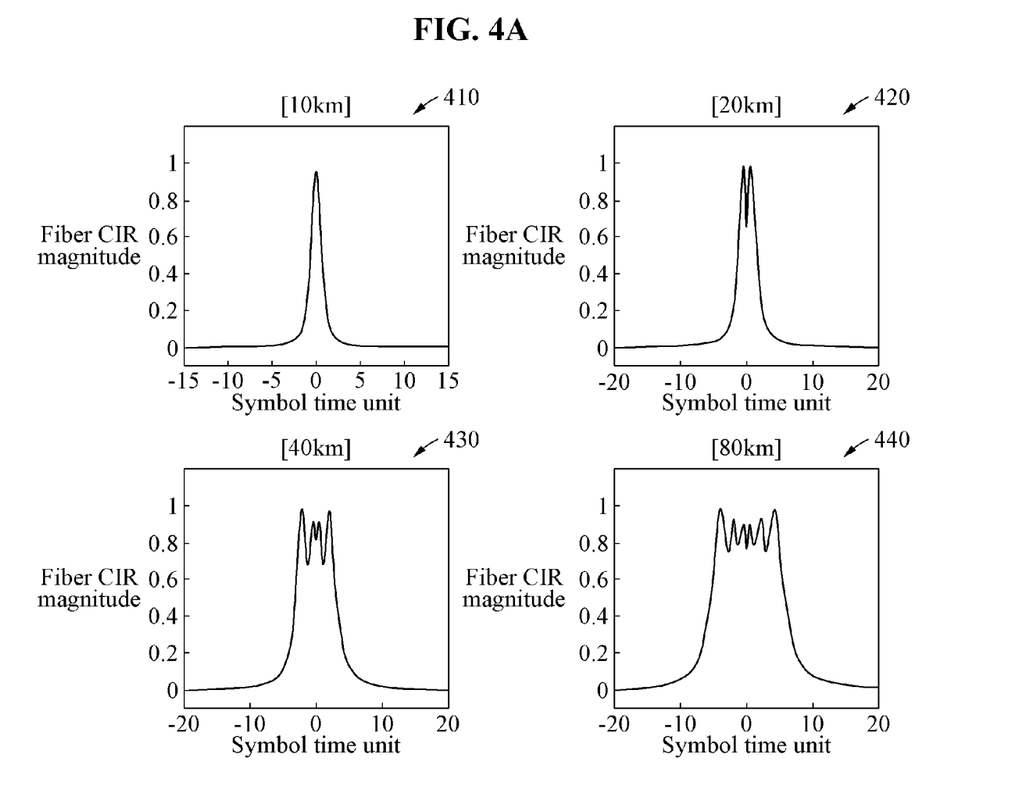
FIG. 4A illustrates graphs showing a valid channel impulse response (CIR) time with respect to a transmission length according to an example embodiment.

FIG. 4A illustrates graphs showing a valid CIR time with respect to a transmission length according to an example embodiment.

Figure 4B:
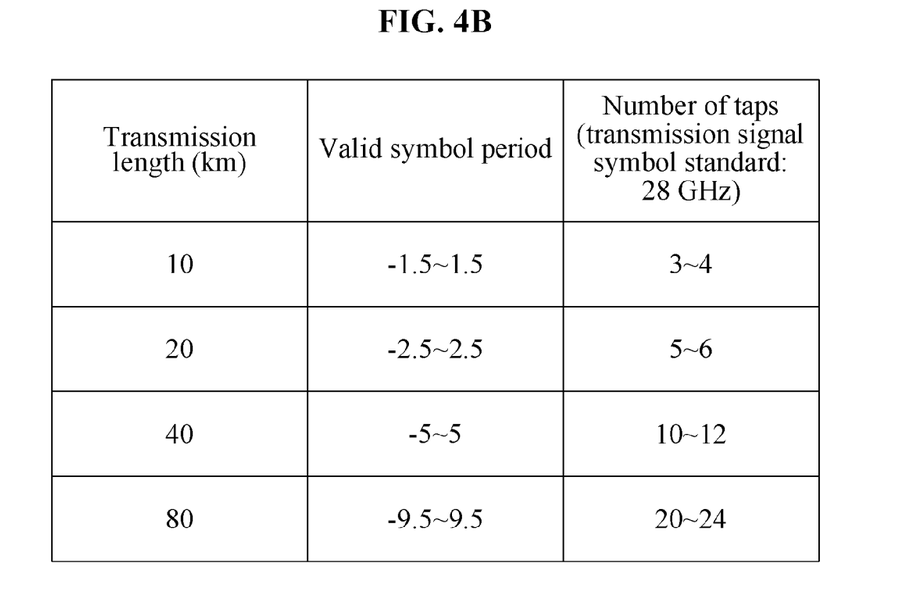
FIG. 4B is a table showing a valid symbol period and a number of taps with respect to a transmission length according to an example embodiment.

FIG. 4B is a table showing a valid symbol period and a number of taps with respect to a transmission length according to an example embodiment.

Referring to FIGS. 4A and 4B, a valid response time of CIR with respect to a transmission length, particularly, a second transmission length which is a residual transmission length, may be known. In FIG. 4A, there are graphs 410, 420, 430, and 440 respectively showing valid impulse responses with respect to transmission lengths of 10 km, 20 km, 40 km, and 80 km, and a valid symbol period may vary as shown in FIG. 4B. In an example in which a length is estimated through a spectrum analysis, the number of taps of the equalizer 170 may be adjusted to a number corresponding thereto. Thus, the number of actually operating taps of the equalizer 170 may be reduced, whereby an unnecessary power consumption may be prevented. For example, the number of implemented taps of the equalizer 170 may be "20". In this example, if a length corresponding to a residual chromatic dispersion is estimated at 10 km through a frequency spectrum analysis, only "4" taps may be set to operate, and the remaining "16" taps may be set not to operate, whereby the power consumption of the equalizer 170 may be reduced.

In an example in which the second transmission length is known through the same spectrum analysis with respect to the received signal having the residual chromatic dispersion after the first transmission length is estimated by obtaining the positions and the number of spectrum nulls of the optical signal and an optical compensation is performed based on the first transmission length, the convergence time of the equalizer 170 may be optimized. The convergence time of the equalizer 170 may be defined as K which denotes an iteration count needed until a value of a mean square error (MSE) reaches a value of $(1+\varepsilon)$, which is expressed by Equation 3.

$$E|e(K)|^2 = (1+\varepsilon)E|e(\infty)|^2$$ [Equation 3]

E denotes a mean, e denotes an instantaneous error, and $\varepsilon$ denotes an error level from a normal state, that is, a difference from the instantaneous error when time is infinite. A convergence time of a least mean square (LMS)-based adaptive equalizer which is generally and widely used may be expressed by Equation 4.

$$K = \frac{\ln\left[\frac{\varepsilon(1 + EMSE/\sigma_v^2)}{SNR - EMSE/\sigma_v^2}\right]}{\ln(\alpha)}$$ [Equation 4]

EMSE denotes an excess mean square error, which is expressed by Equation 5.

$$EMSE = \frac{\mu \cdot \sigma_u^2 \cdot M}{2 - \mu \cdot \sigma_u^2 \cdot (M + \gamma - 1)}$$ [Equation 5]

$\mu$ denotes a step size of the equalizer 170, M denotes the number of taps of the equalizer 170, $\sigma_v^2$ denotes noise, $\gamma$ denotes a constant, which has a value of "1" for a real-number signal and a value of "2" for a complex-number signal. $\sigma_v^2$ denotes a variance value of a regression vector in the equalizer 170.

From Equation 4 and Equation 5, it may be learned that the convergence time of the equalizer 170 depends on the number M of used taps of the equalizer 170, an output signal-to-noise ratio (SNR) when the equalizer 170 optimally converges, and the step size $\mu$ of the equalizer 170.

The equalizer 170 may sample an input signal, for example, the optical signal including the residual chromatic dispersion, at a plurality of locations on a time domain. The used taps of the equalizer 170 may correspond to the sampling locations, and the number of used taps of the equalizer 170 may correspond to the number of the sampling locations.

The equalizer 170 may iteratively remove the residual chromatic dispersion, and the step size of the equalizer 170 may correspond to the size of chromatic dispersion removed at a single iteration.

When the second transmission length with respect to the signal having the residual chromatic dispersion is estimated and the number of valid taps corresponding thereto is set, the convergence time for convergence to a desired MSE may be obtained from Equation 4 and Equation 5 by adjusting the step size $\mu$ of the equalizer 170, wherein the value of the step size p may be adjusted within a range of the size that the equalizer 170 may converge to. An electronically compensable convergence speed of the equalizer 170 may be adjusted suitable for a residual compensation, whereby the convergence speed of the equalizer 170 may be optimized.

The SNR in Equation 4 may depend on a characteristic of the input signal and an initial parameter value of the equalizer 170. Depending on a set value of an initial equalizer error e(0), whether the equalizer 170 converges and the convergence speed thereof may vary. The received input signal may be affected by a transmission channel, and a characteristic of the optical transmission channel may be affected by the length of the optical fiber. Since the channel characteristic varies depending on the optical transmission length, a CIR corresponding to a transmission length may be inferred when the transmission length is estimated in advance, and thus the initial parameter value of the equalizer 170 optimized to the stability and the convergence speed of the equalizer 170 may be set based on the CIR.

When the number M of taps corresponding to an equivalent transmission length is satisfied, and a value of µ is within the range of size that the equalizer 170 can converge to, k satisfying Equation 4 and Equation 5 may be determined.

TABLE 1

(Example of determining parameter (problem formulation)
Objective: M and µ to minimize K (Equation 4/Equation 5)
where
M corresponding to equivalent transmission length is satisfied
value of µ is within range of size that the equalizer 170 can converge to)

Figure 5:
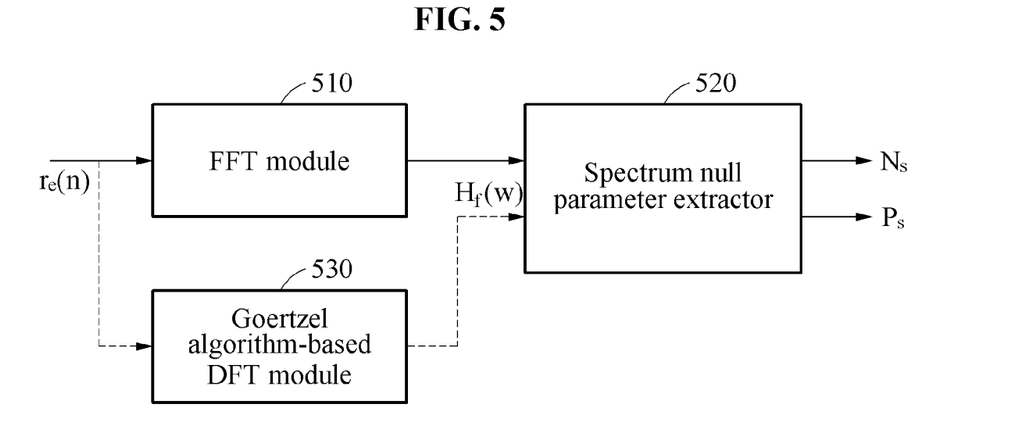
FIG. 5 illustrates a spectrum null analyzer according to an example embodiment.

FIG. 5 illustrates the spectrum null analyzer 110 according to an example embodiment.

Referring to FIG. 5, a method of obtaining a frequency spectrum may use a transform module. The transform module may include, for example, a fast Fourier transform (FFT) module 510, or a Goertzel algorithm-based discrete Fourier transform (DFT) module 530. The Goerzel method may be relatively applied when the number of DFT-points is small. A method of obtaining a frequency response such as multiple signal classification (MUSIC) which obtains a high-precision frequency spectrum response may also be included. With respect to a frequency response spectrum Hf(w), a positional order k at which a spectrum null occurs, an order pair set Ps of a k-th spectrum null frequency fk, and the number Ns of null frequencies may be obtained through a spectrum null parameter extractor 520.

Figure 6A:
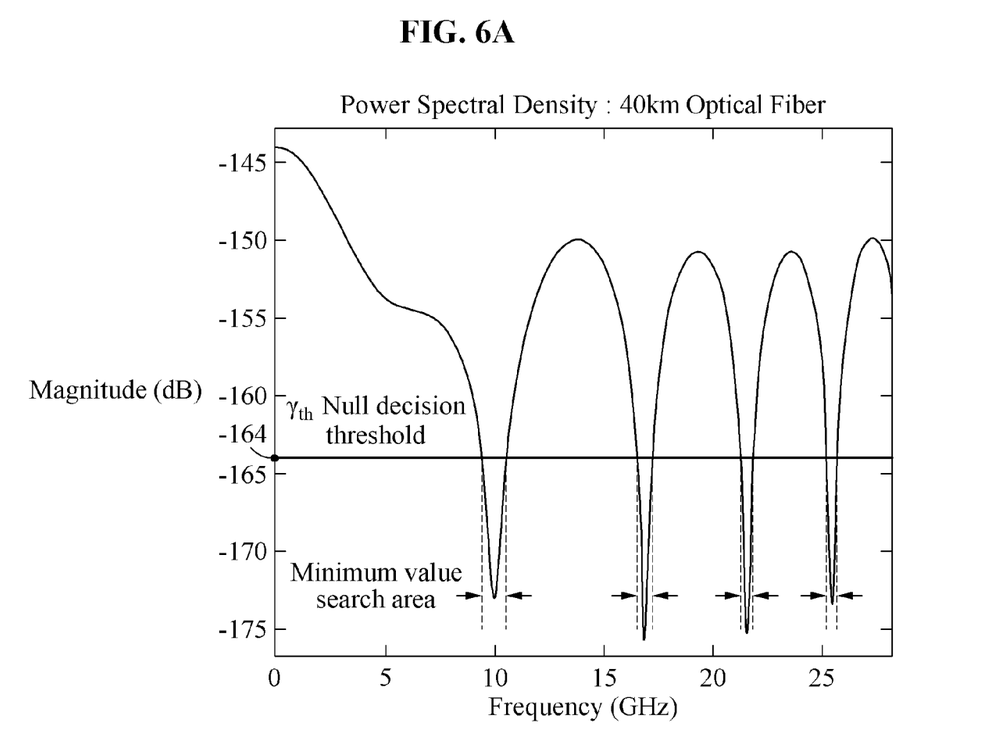
FIG. 6A is a graph showing a frequency spectrum null parameter extractor using threshold setting according to an example embodiment.

FIG. 6A is a graph showing the frequency spectrum null parameter extractor 520 using threshold setting according to an example embodiment.

Referring to FIG. 6A, the frequency the spectrum null parameter extractor 520 may set a threshold γth having a predetermined value with respect to a frequency spectrum generated through the FFT module 510 or the Goertzel algorithm-based DFT module 530, detect minimum values with respect to a period having a value less than the threshold, determine the detected minimum values to be nulls, and extract positions of the nulls and frequency values corresponding thereto. For example, in FIG. 6A, a null decision threshold may be set to −164 dB, a period from a point in time at which a value decreases below −164 dB to a point in time at which the value returns to −164 dB may be set to be a minimum value search area, and a minimum value in the area may be determined to be a null. In the example of FIG. 6A, "4" nulls and respective frequencies thereof may be output.

Figure 6B:
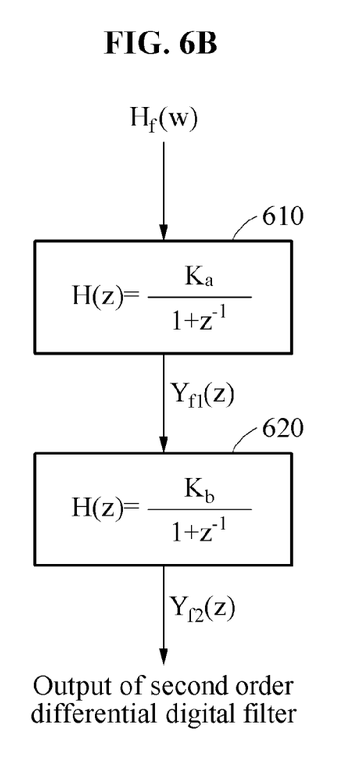
FIG. 6B illustrates a frequency spectrum null parameter extractor to which a second order differential digital filter is applied according to an example embodiment.

FIG. 6B illustrates the frequency spectrum null parameter extractor 520 to which a second order differential digital filter is applied according to an example embodiment.

Referring to FIG. 6B, the frequency the spectrum null parameter extractor 520 may apply a second order differential digital filter which obtains a second order differential with respect to a frequency spectrum. By using a fact that a location at which f'(x)=0 and f"(x)>0 are satisfied with respect to a predetermined single variable function f(x) has a local minimum value, locations at which a signal Yf1(z) passing through a first order differential digital filter 610 is "0" with respect to an input Hf(w) may be detected, and locations having positive values with respect to an output of a second order differential Yf2(z) among the detected locations may be detected through a second order differential digital filter 620, whereby positions and the number of the spectrum nulls may be transmitted.

Figure 7:
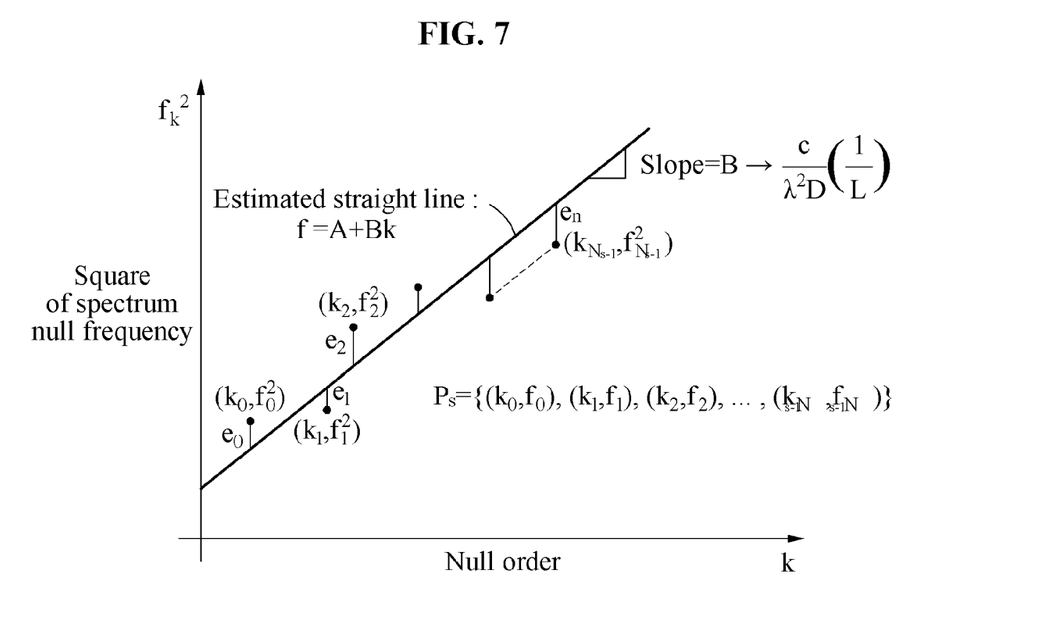
FIG. 7 is a graph showing a transmission length estimation method according to an example embodiment.

FIG. 7 is a graph showing a transmission length estimation method according to an example embodiment.

Referring to FIG. 7, the transmission length estimator 120 may estimate a transmission length from the positional order k at which the spectrum null occurs, the order pair set Ps of the k-th spectrum null frequency fk, and the number Ns of null frequencies obtained through the spectrum null analyzer 110. Equation 2 may be written as expressed by Equation 6.

$$f_k^2 = \frac{c}{2 \cdot \lambda^2 D \cdot L}(1 + 2k)$$ [Equation 6]

By using a fact that a square of a null frequency establishes a relationship of a first order straight line with a k-th position at which a null occurs, the transmission length may be estimated. As shown in FIG. 7, a value of {k, fk} of Ps has an error ek from a theoretical value. Thus, a length should be estimated from such order pair sets so as to minimize the error. A square error estimation method may be used to find a slope most similar to the theoretical value from the actually estimated Ps. The slope may be found so as to minimize a square error of the estimated value Ps and the first order straight line obtained by Equation 6. If an equation for a desired straight line is assumed as f=A+Bk, equations A and B for a straight line which minimizes a sum of squares of e0, e1, e2, . . . and the like, which are differences between fk and values on the estimated straight line at the k-th null of FIG. 7, may be obtained. Values of A and B may be expressed by Equation 7.

$$A = \frac{\sum_{k=0}^{N_s-1} f_k}{N_s}, B = \frac{\sum_{k=0}^{N_s-1} f_k \cdot \delta_k}{\sum_{k=0}^{N_s-1} \delta_k^2}$$ [Equation 7]

$\delta_k$ denotes a difference between the obtained null sequence (null order) and a mean value.

$$\delta_k = k - \hat{k}, \hat{k} = \frac{0 + 1 + 2 + 3 + \ldots + k_{N_s-1}}{N_s}$$

may be satisfied.

By applying the estimated values A and B and the relationship of Equation 6, the values A and B may be expressed by Equation 8.

$$A = \frac{c}{2 \cdot \lambda^2 D \cdot L}, B = \frac{c}{\lambda^2 D \cdot L}$$ [Equation 8]

The transmission length may be expressed by Equation 9.

$$L = \frac{c}{\lambda^2 D \cdot B}$$ [Equation 9]

In the above equation, in an example in which the number of null positions of the spectrum is "1", that is, if k=0, the equation related to A in Equation 8 may be used.

The dispersion parameter D, the wavelength λ, and the speed of light c may be predetermined values.

Values corresponding to Equation 2 may be stored in a table, and a transmission length corresponding to the values may be estimated from Ps and Ns.

The second transmission length may be transmitted to the equalizer parameter setter 180. The number of valid taps of the equalizer 170 may be set based on the second transmission length. Since a valid section of CIR corresponding to the second transmission length is known in advance, the number of taps may be set based on the same. If the total number of taps of the equalizer 170 is M, Ntap taps corresponding to the valid period of CIR corresponding to the second transmission length may be used, and remaining M-Ntap taps may not be used, whereby a processing complexity of the equalizer 170 may be reduced and the power consumption may also be reduced. After Ntap is set, the step size of the equalizer 170 and the initial parameter of equalizer 170 may be set based on the second transmissions length and the MSE to optimize the convergence speed of the equalizer 170. The equalizer 170 may perform an equalization process based on the parameter value set through the equalizer parameter setter 180, thereby compensating for the residual chromatic dispersion after the optical chromatic dispersion compensation is performed through the estimation of the first transmission length and obtaining a restored signal with respect to the received signal.

Figure 8:
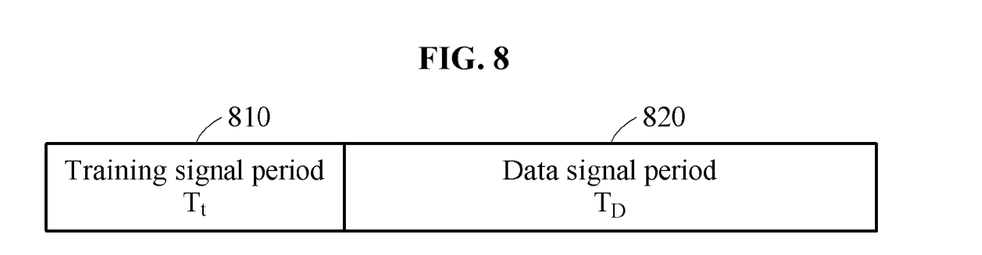
FIG. 8 illustrates a configuration of an optical transmission signal according to an example embodiment.

FIG. 8 illustrates a configuration of an optical transmission signal according to an example embodiment.

Referring to FIG. 8, to transmit an optical signal, the optical signal may be configured of a training signal period $T_t$ 810 and a data signal period $T_D$ 820. The training signal period $T_t$ 810 may include a signal in which data known in advance is modulated, and thus a bit error rate of the equalizer 170 may be known through a comparison to a signal known after equalization is performed at a reception end. The equalization process based on a transmission length estimation may be performed during the training signal period.

According to example embodiments, a chromatic dispersion compensation method and apparatus may perform an optical compensation and an electronical compensation to compensate for a chromatic dispersion. A transmission length may be estimated based on an optically compensated signal, the optical compensation may be dynamically performed through the estimated transmission length, and an electronic dispersion compensation may be performed with respect to only a residual chromatic dispersion through an equalizer. Through this, a communication transmission length may extend, a power consumption of the equalizer may be reduced, and a convergence time of the equalizer may be shortened.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical communication method comprising:
   receiving an optical signal;
   estimating a first transmission length based on a null component included in a frequency spectrum of the optical signal;
   optically compensating for a chromatic dispersion of the optical signal based on the first transmission length;
   estimating a second transmission length based on a null component included in a frequency spectrum of the compensated optical signal; and
   electronically compensating for a residual chromatic dispersion of the compensated optical signal based on the second transmission length.

2. The optical communication method of claim 1, wherein the first transmission length is greater than the second transmission length.

3. The optical communication method of claim 1, wherein the estimating of the first transmission length comprises:
   extracting at least one null component from the frequency spectrum of the optical signal; and
   estimating the first transmission length based on a position and a number of the extracted null component.

4. The optical communication method of claim 1, wherein the optically compensating comprises removing the chromatic dispersion from the optical signal by inversely generating a chromatic dispersion effect corresponding to the first transmission length.

5. The optical communication method of claim 1, wherein the estimating of the second transmission length comprises:
   extracting at least one null component from the frequency spectrum of the compensated optical signal; and
   estimating the second transmission length based on a position and a number of the extracted null component.

6. The optical communication method of claim 1, wherein the electronically compensating comprises optimizing a convergence time of an equalizer for electronically compensating for the residual chromatic dispersion based on the second transmission length.

7. The optical communication method of claim 6, wherein the optimizing comprises:
   estimating a valid period of a channel impulse response based on the second transmission length; and
   determining a parameter of the equalizer based on the valid period.

8. The optical communication method of claim 1, wherein the electronically compensating comprises adjusting a number of taps based on the second transmission length.

9. A non-transitory computer-readable medium storing a control program for instructing a computer to perform the optical communication method of claim 1.

10. A chromatic dispersion compensation apparatus comprising:
   a spectrum null analyzer configured to analyze a frequency spectrum of an optical signal;
   a transmission length estimator configured to estimate a first transmission length based on a null component included in the frequency spectrum;
   an optical dispersion compensation module configured to optically compensate for a chromatic dispersion of the optical signal based on the first transmission length; and
   an equalizer configured to electronically compensate for a residual chromatic dispersion of the compensated optical signal.

11. The chromatic dispersion compensation apparatus of claim 10, wherein the spectrum null analyzer comprises:
   a transform module configured to obtain the frequency spectrum of the optical signal; and
   a spectrum null parameter extractor configured to extract at least one null component from the frequency spectrum of the optical signal.

12. The chromatic dispersion compensation apparatus of claim 10, wherein the transmission length estimator is configured to estimate the first transmission length based on a position and a number of the extracted null component.

13. The chromatic dispersion compensation apparatus of claim 10, wherein the transmission length estimator is configured to estimate a second transmission length based on a null component included in a frequency spectrum of the optically compensated optical signal.

14. The chromatic dispersion compensation apparatus of claim 10, further comprising:
   an equalizer parameter setter configured to set a parameter of the equalizer so as to optimize a convergence time of the equalizer for electronically compensating for the residual chromatic dispersion based on the second transmission length, and transmit the set parameter to the equalizer.

15. The chromatic dispersion compensation apparatus of claim 10, further comprising:
   an optical receiver configured to restore transmission information based on the optical signal compensated by the optical dispersion compensation module.

* * * * *